United States Patent [19]

Bass

[11] Patent Number: 5,624,651
[45] Date of Patent: Apr. 29, 1997

[54] STABLE HIGH SOLIDS, HIGH RATIO ALKALI METAL SILICATE SOLUTIONS

[75] Inventor: Jonathan L. Bass, Audubon, Pa.

[73] Assignee: PQ Corporation, Valley Forge, Pa.

[21] Appl. No.: 603,667

[22] Filed: Feb. 20, 1996

[51] Int. Cl.$^6$ .................................................. C01B 33/32
[52] U.S. Cl. ............................................. 423/332; 210/681
[58] Field of Search .............................. 423/332; 210/681

[56] References Cited

U.S. PATENT DOCUMENTS

| | | | |
|---|---|---|---|
| 2,244,325 | 6/1941 | Bird | 252/313 |
| 2,631,134 | 3/1953 | Iler et al. | 252/313 |
| 2,650,200 | 8/1953 | Iler et al. | 252/313 |
| 3,113,112 | 12/1963 | McNally et al. | |
| 3,492,137 | 1/1970 | Iler | |
| 3,533,816 | 10/1970 | Oken | |
| 3,625,722 | 12/1971 | Freyhold et al. | |

FOREIGN PATENT DOCUMENTS 126984  5/1969  United Kingdom ................. 423/332

*Primary Examiner*—Wayne Langel
*Assistant Examiner*—Karen Joyce
*Attorney, Agent, or Firm*—Ernest G. Posner

[57] ABSTRACT

Disclosed is a method of increasing the silica to metal oxide ratio in alkali metal silicate solutions by removing smaller size anions from the solution using a strong cation exchange resin comprising: condensing the smaller size anions as silica in the pores of the strong cation exchange resin; leaving the larger, more siliceous anions in the external solution.

10 Claims, No Drawings

STABLE HIGH SOLIDS, HIGH RATIO ALKALI METAL SILICATE SOLUTIONS

BACKGROUND OF THE INVENTION

1. Field of the Invention

The present invention relates to a method of increasing the silica to metal oxide ratio in alkali metal silicate solutions by changing the distribution of the component silicate anions in solution. More particularly, the present invention relates to a method of increasing the silica to metal oxide ratio in alkali metal silicate solutions containing smaller and larger anions therein by removing the smaller size anions using a strong cation exchange resin to condense some of the smaller size anions as silica in the pores of the strong cation exchanger resin and leaving the larger, more siliceous anions in the solution.

2. Reported Developments

Alkali metal silicate solutions have many technical applications including their application: as binders in coatings; as thickening agents and stabilizers in paints; as adhesives; as special cements; as raw materials for the production of silica sols and gels; and as components in vehicles for pharmaceutical and cosmetic compositions. Furthermore, sodium silicates are used as cleaners and detergents that require a controlled alkalinity. Sodium silicate solutions with molar $SiO_2:Na_2O$ ratios less than 2.5, especially meta- and orthosilicates, are most commonly used in cleaners and detergent products.

When used as binders, adhesives and deflocculants, which depend on the presence of polysilicate ions, sodium silicates having an $SiO_2:Na_2O$ molar ratio of 2.5 to 3.8 are required. For maximum adhesive strength the lower ratio types are used because they can be obtained with a higher concentration of solids. For more water resistant bonds, the higher ratios are preferred.

For the production of precipitated silicas, sols, and gels, sodium silicates of molar ratios of about 3.3 are used rather than the lower ratios, since less acid is required for neutralization of alkali per unit of silica, and this ratio is available at low cost because such large volumes are produced and because the alkali component is more expensive than the siliceous component. If, on the other hand, acid consumption is an important factor, higher ratios may be used to advantage.

The properties of alkali metal silicates, such as viscosity, concentration, adhesive strength, rate of solidification, solubility in water, and stability of the solution are closely related and are largely controlled by the variables of the alkali metal used, the ratio of $SiO_2$ to alkali metal oxide expressed by either weight or molar ratio, and the concentration of solids in the solution. Sodium silicates are produced as glasses having $SiO_2:Na_2O$ molar ratios of 1.6–3.9. These are sold in lump or pulverized forms and as partly hydrated powders and concentrated solutions. For the production of colloidal and finely divided silica powders the 3.25 ratio sodium silicate solution is predominantly used.

The maximum practical silica concentration in commercial sodium silicate solutions is limited by the viscosity which must be low enough for the solutions to be poured under ordinary conditions. The higher the $SiO_2:Na_2O$ ratio, the lower the maximum silica concentration in commercial products. The composition of typical commercial alkali metal silicates are shown in Table I.

TABLE I

| Alkali Metal | Wt. Ratio $SiO_2:M_2O$ | Molar Ratio $SiO_2:M_2O$ | $SiO_2$ (%) | $Na_2O$ (%) | Density (lb/gal) | Viscosity (centipoise) |
|---|---|---|---|---|---|---|
| Sodium | 3.75 | 3.87 | 25.3 | 6.75 | 11.0 | 220 |
| | 3.25 | 3.36 | 29.9 | 9.22 | 11.8 | 830 |
| | 3.25 | 3.36 | 28.4 | 8.7 | 11.6 | 160 |
| | 3.22 | 3.33 | 27.7 | 8.6 | 11.5 | 100 |
| | 2.87 | 2.97 | 32.0 | 11.1 | 12.4 | 1,250 |
| | 2.58 | 2.67 | 32.1 | 12.5 | 12.6 | 780 |
| | 2.50 | 2.58 | 26.5 | 10.6 | 11.7 | 60 |
| | 2.40 | 2.48 | 33.2 | 13.85 | 13.0 | 2,100 |
| | 2.20 | 2.27 | 29.2 | 13.3 | 12.5 | — |
| | 2.00 | 2.07 | 29.4 | 14.7 | 12.8 | 400 |
| | 2.00 | 2.07 | 36.0 | 18.0 | 14.1 | 70,000 |
| | 1.90 | 1.96 | 28.5 | 15.0 | 12.7 | — |
| | 1.80 | 1.86 | 24.1 | 13.4 | 12.0 | 60 |
| | 1.60 | 1.65 | 31.5 | 19.7 | 14.0 | 7,000 |
| Potassium | 2.50 | 3.92 | 20.8 | 8.3 | 10.5 | 40 |
| | 2.20 | 3.45 | 19.9 | 9.05 | 10.5 | 7 |
| | 2.10 | 3.29 | 26.3 | 12.5 | 11.5 | 1,050 |

The prior art has spent a great deal of effort to provide alkali metal silicates of desired $SiO_2:Na_2O$ molar ratios and solid contents. While the selection of a particular alkali metal oxide is rather easy, the provision of proper ratios and solid contents proved to be difficult requiring various theories and approaches to design methods for obtaining them. The difficulty lies in the nature of sodium silicates in water including solubility, viscosity, rate of solidification, and stability which are controlled by the ratio of $SiO_2:Na_2O$; relatively small changes in the ratio result in unpredicted and/or undesirable properties.

Solutions with a low mole ratio, that is up to about 2 $SiO_2:M_2O$, where M is sodium or potassium, are very stable and have a low viscosity even at fairly high concentrations, but when they are used as binders or adhesives they set slowly and the bonds have little resistance to weathering, and therefore are not acceptable in such technical applications. Alkali metal silicate solutions having a mole ratio between 2 and 4 $SiO_2:M_2O$ set more rapidly and the bond is less readily soluble but they do have undesirably high viscosities and low stabilities especially in the higher ranges above 3.5. It is to be expected that the setting rate, bond strength, and the resistance to weather should increase as the mole ratio of silica to metal oxide is increased above 4.

Unfortunately, such solutions are so unstable and so viscous as to be impractical either to manufacture by ordinary means or to employ in technical applications.

In many of these technical applications it is necessary to have solutions of alkali metal silicate at high concentrations with good adhesive properties, rapid setting rates, and bonds which are resistant to re-solution by water, and at the same time the alkali silicate solution should have a low viscosity and a good stability at ambient temperatures over long periods of time.

Typical examples of the prior art approaches to provide alkali metal silicate solutions with desired ratios of $SiO_2$: metal oxide and solid contents follow.

U.S. Pat. No. 3,113,112 relates to a process for the preparation of stable aqueous silica solutions comprising: mixing an aqueous solution of a soluble silicate with a weakly acidic cation exchange resin in the hydrogen form which has been adjusted to a pH between 6 and 8 so as to remove most of the alkali; and treating the mixture by centrifugation, filtration or decantation to separate the solution from the cation exchanger. The solution is concentrated by means of evaporation and its pH is adjusted to between 9.5 to 10.5 to insure stability during storage.

U.S. Pat. No. 3,625,722 pertains to a process for preparing stable alkali metal silicate solutions having silica contents of from 10 to 35% and ratios ranging between 4:1 and 12:1 $SiO_2$: alkali metal oxide. Stability is obtained by incorporating a small amount of a quaternary ammonium compound.

U.S. Pat. No. 3,492,137 discloses siliceous compositions containing 10 to 35% by weight silica and sodium oxide and having a silica to sodium oxide weight ratio of 4.0:1 to 6.0:1, made by mixing colloidal amorphous silica with a sodium silicate solution and heating the mixture between 40° to 100° C.

U.S. Pat. No. 3,533,816 relates to a method of making high ratio alkali metal silicates comprising: rapidly mixing a silicic acid solution with an alkali metal hydroxide or silicate solution at room temperature to give a solution having a $SiO_2$:M2O mole ratio of 4 to 6 or 8 to 40; and concentrating the solution by vacuum evaporation at a temperature up to 45° C. The silicate solution must have a $SiO_2$ concentration of less than 3.5% w/w since more concentrated solutions gel.

I have now discovered a method by which a high silica to metal oxide ratio in alkali metal solutions can be achieved, as well as the concentration of alkali metal solutions increased without the drawbacks of costly and cumbersome procedures, precipitation and gelation. As contrasted to the prior art using specific starting materials limited by pH and particle size to achieve the desired end products, the present invention uses a variety of commercially available water soluble alkali metal silicates.

SUMMARY OF THE INVENTION

The present invention provides a separation method based on particle size of molecules present in alkali metal solutions and uses a strong cation exchange resin capable of excluding/separating molecules based on their size.

Alkali metal oxide silicate solutions contain silicate anions ranging in size of from about 92 daltons molecular weight for monomeric silicates to well over 1,000 daltons molecular weight for polymeric silicate anions. The lager size anions are more siliceous than the smaller size anions.

Strong cation exchange resins which are cross linked have pores containing hydrogen exchange sites. Smaller molecular weight size silicate anions enter the pores of the resins, exchange with hydrogen ion sites, condense as silica and remain in the pores.

In accordance with the present invention, a method of preparing an aqueous alkali metal oxide silicate solution is provided having a silica to alkali metal oxide molar ratio of from about 3.5 to about 6.0 and a total solids content of from about 20 to 40% w/w, said method comprising the steps of:

contacting a strong hydrogen exchanged cation exchange resin cross linked of from about 10 to about 16% with an alkali metal silicate solution;

mixing said resin with said alkali metal silicate solution by vigorous stirring or agitation to allow separation of smaller anionic molecules by exchange with hydrogen ion sites on said resin from larger, more siliceous anionic molecules; and collecting said larger, more siliceous anionic molecules from said alkali metal oxide silicate solution.

DETAILED DESCRIPTION OF THE INVENTION

The present inventive process utilizes strong cation exchange resins, which are totally hydrogen ion exchanged and water soluble alkali metal silicates as reactive starting materials to produce an alkali metal oxide silicate solution having a silica to alkali metal oxide molar ratio of from about 3.5 to about 5.0 and a total solids content of from about 20 to about 40% w/w. These starting materials will now be described.

The Cation Exchange Resin

The ion exchange resin used in the present invention is commercially available and can also be made using techniques available in the prior art, such as disclosed, for example, in U.S. Pat. No. 4,198,395 wherein the resin matrix is prepared by copolymerizing styrene with a cross linking monomer, such as, divinylbenzene. The invention uses a batch ion exchange process, rather than ion exchange chromatography. In the resin matrix, small silicate anions which are negatively charged are balanced by positively charged sodium (or potassium) ions. Because the selectivity of the resin is greater for sodium, these ions replace hydrogen ions in the matrix. The hydrogen ions which are now in the solution within the resin pores react with the silicate ions leading to condensation of larger silica particles in the pores.

Contrary to the present invention, ion exchange chromatography is used for sample fractionation, solution, and purifcation.

Fractionation separates a sample into several bands: all of the molecules in solution carrying a charge opposite to the charge on the ion exchange matrix are sorbed to the column, with the most highly charged are held most strongly. The introduction of a solvent first elutes the least highly charged molecules. Increasing solvent concentration results in the elution of the remaining molecules as separate bands.

In the method of sorption, the substance of interest is retained on the matrix of opposite charge, while interfering substances, which may be neutral or carry the same charge as the matrix, are eluted.

In the method of purification, the substance of interest is eluted from the column while interfering counterions are retained.

The method of the present invention is somewhat analogous to the method of purification in a retention/elution aspect while also being different therefrom in some other important aspects. To wit: the undesirable low molecular weight alkali silicates are retained in the resin matrix while the high molecular weight, highly siliceous ions are eluted from the resin as the desired product. However, both the low and high molecular weight molecules carry negative counterions unlike in the customary purification technique where the interfering counterions having opposite charges to that of the matrix are retained in the column matrix and ions having the same charges as the matrix are eluted.

In the process of the present invention the alkali metal ions are positively charged. The small silicate anions enter the pores by diffusion, rather than by electrostatic attraction, carrying the alkali metals as charge balancers. Once the anions are in the pores, with their accompanying cations, the cations exchange, and the hydrogen ions released by the exchange effect condensation of silica. The high ratio silicate remaining outside the resin is not really eluted in the sense that chromatographers would use, but is simply the composition remaining after the resin particles are removed.

The cation exchange resin used in the present invention is available from chemical companies, such as, for example, the Dow Chemical Company and Diaion Chemical Company of Japan. Illustrative examples of these resins along with properties pertinent to the present invention are shown in Table II.

chemically unchanged by the ionic interactions which take place at the functional groups, and the resin can be readily regenerated. The styrene divinylbenzene ion exchange resins preferably used in the present invention have a rigid gel type structure. Their matrix consist of polystyrene chains tied together at intervals by divinylbenzene groups. The percentage of cross-linking agent used determines solubility, swelling characteristics, and selectivity, as well as other physical and chemical properties. As the crosslinkage decreases, permeability increases, and the ability of the resin to accommodate larger molecules is increased. The high cross linked resins of 10–16% exhibit properties in the opposite direction: as the amount of divinylbenzene is increased in the co-polymer matrix, the crosslinkages occur at closer intervals and the effective pore size, permeability, and tendency of the resin to swell in solution are reduced. Wet volume capacity increases because highly cross linked particles swell only slightly and contain more exchange sites for unit volume than a resin of low crosslinkage. Permeability, that is, pore size, is low but sufficient for the inorganic ions of the present invention. The degree of crosslinking provides a control for exclusion/inclusion of molecules which can or cannot enter into, and bind to sites in the resin. Table III shows approximate limits of exclusion of molecules based on molecular weights.

TABLE II

Cation Exchangers on Polystyrene

| Cat. No. | Exchanger | % Cross Link | Matrix | Mesh | Ionic Form | % Moisture (approx) | Max. Op. Temp. (°C) | Total Exchange meq/mL | Capacity meq/g anhydrous | pH Range |
|---|---|---|---|---|---|---|---|---|---|---|
| Diaion Strong Cation Exchangers (Sulfonic Acid) | | | | | | | | | | |
| 1-3556-1-3559 | HPK25 | — | HP | 16–50 | Na | 42 | 125 | 1.8 | 3.9 | 0–14 |
| 1-3560-1-3563 | PK228 | 14 | P | 16–50 | Na | 40 | 120 | 2.0 | 4.2 | 0–14 |
| 1-3564-1-3567 | SK1B | 8 | G | 16–50 | Na | 46 | 120 | 1.9 | 3.6 | 0–14 |
| 1-3568-1-3571 | SK1Bs | 8 | G | 150–350 μm | Na | 46 | 120 | 1.9 | 4.0 | 0–14 |
| 1-3572-1-3575 | SK104 | 4 | G | 16–50 | Na | 62 | 120 | 1.2 | 4.0 | 0–14 |
| 1-3576-1-3579 | SK112 | 12 | G | 16–50 | Na | 37 | 120 | 2.1 | 3.9 | 0–14 |
| 1-3580-1-3583 | SK116 | 16 | G | 16–50 | Na | 32 | 120 | 2.1 | 3.6 | 0–14 |
| Dowex Strong Cation Exchangers (Sulfonic Acid) | | | | | | | | | | |
| 50 × 8-100 | 50WX8 | 8 | G | 50–100 | H | 53 | 150 | 1.7 | 4.8 | 0–14 |
| 50 × 8-200 | 50WX8 | 8 | G | 100–200 | H | 54 | 150 | 1.7 | 4.8 | 0–14 |
| 50 × 8-400 | 50WX8 | 8 | G | 200–400 | H | 54 | 150 | 1.7 | 4.8 | 0–14 |
| 18505 | HCR-S | 8 | G | 20–50 | H | 53 | 150 | 1.8 | 4.8 | 0–14 |
| 18880 | HCR-W2 | 8 | G | 16–40 | H | 52 | 150 | 1.8 | 4.8 | 0–14 |
| 1-3440-1-3443 | HCR-W2 | 8 | G | 16–40 | Na | 46 | 150 | 2.0 | 3.7 | 0–14 |
| 1-3448-1-3451 | HGR-W2 | 10 | G | 16–40 | H | 40 | 150 | 2.2 | 4.2 | 0–14 | wherein: G = gel; HP = highly porous; P = porous

Despite the diversity of the ion exchange resins obtainable from various sources, they possess common properties which enables them for use in practicing the present invention.

The resins consist of an insoluble porous lattice with attached functional groups, and are available in the form of beads, and granular particles. The resin matrix remains

TABLE III

Approximate Molecular Weight Exclusion Limits for Ion Exchange Resins in Water Based on Cross Linking.

| % Cross Linking | MW for Globular Molecules |
|---|---|
| 2% | 2,700 |
| 4% | 1,400 |
| 8% | 1,000 |
| 10% | 800 |
| 12% | 400 |

In using ion exchange resins in the practice of the present invention, the speed of the process as well as resolution can be influenced by the particle size and shape of the resin particles. In reference to particle size, mesh refers to the number of openings per inch of the screen used to size ion exchange resins. The larger the mesh size number, the smaller the particle size. The mesh designations are based on the number of strands per inch in U.S. standard sieves. A 200–400 mesh resin could be used for high resolution chromatography, and a 100–200 mesh when lesser resolution is satisfactory. We prefer to use 50–100 mesh sizes for large scale applications and batch operations where resin and sample are slurried together.

The porosity of the resin is defined in terms of the molecular size of the largest ion that is able to penetrate the cross linked matrix under a given set of conditions. The porosity of the resin is another way of defining the exclusion limits referred to above. As the molecular size of the solute increases, the penetration of the molecules become more difficult thereby allowing the separation of smaller molecules from larger ones. In essence the porous matrix of the resin acts as a molecular sieve excluding molecules which are too large to enter the pores and allowing smaller molecules to enter into the pores and bind with the sites of the hydrogen ions which are being exchanged by the cations associated with the smaller molecules. The large molecules then can be removed from the resin bed and separated as the desired, more siliceous product.

While the resin matrix of a copolymer of styrene-divinylbenzene is preferred for use in the present invention, other cross linking agents, such as divinyltoluene, divinynaphthalene and divinylxylene may also be used to obtain the cation exchange resin having the preferred degree of cross linking of from about 10 to about 16%. For certain end products, the degree of cross linking may be lowered or increased in the spirit of the present invention. Typically, such resins have the following characteristics:

| concentration of active groups | 15–30% |
|---|---|
| exchange capacity | 3.9–6 meq/g |
| percent of cross linking | 4–20% |
| average pore diameter | 150–200 Å |
| specific surface areas | 70–100 m$^2$/g |
| porosity | 0.4–0.6 cc/g |
| real density | 0.9–1.1 g/cc |
| apparent density | 0.5–0.6 g/cc |
| particle size distribution | 50–100 mesh |

The Water Soluble Alkali Metal Silicates

The present invention utilizes, as starting material the water soluble commercial silicates having the general formula:

$$M_2O \cdot mSiO_2 \cdot nH_2O$$

where

M is an alkali metal selected form the group of sodium, potassium and lithium, preferably sodium;

m is the number of moles of $SiO_2$; and n is the number of moles of $H_2O$.

Commercial forms of these materials are typically manufactured as a glass that dissolves in water to form viscous alkaline solutions. The values for m for commercial materials generally are between 0.5–4.0. The most common form of soluble silicate, sometimes called water glass, has an m value of 3.3.

The present invention utilizes to advantage any commercially available starting materials and/or staring materials defined by the general formula including sodium orthosilicate, sodium metasilicate and sodium disilicate. The present invention may also utilize monosilicic acid, Si(OH)$_4$, which on standing self-polymerizes to higher molecular weight polysilicic acids in aqueous solutions, thereby forming larger particles which lend themselves to separation by the process of the present invention. The molecular weight on standing and the degree of polymerization is shown hereunder:

| Days | Molecular Weight | Degree of Polymerization |
|---|---|---|
| 1 | 3,440 | 52 |
| 2 | 7,940 | 122 |
| 3 | 11,400 | 175 |
| 5 | 20,960 | 325 |
| 8 | 29,430 | 460 |

As the polymeric particles grow in size their numbers decrease in the solution. Any increase in molecular weight involves the growth of particles. The particle growth results in aggregation through the process of coagulation or flocculation. In the coagulation and flocculation process the particles come together and form close-packed clumps or precipitates in which the silica is more concentrated. In the method of the present invention the un-aggregated small silicate anions enter the pores of the resin matrix by diffusion, rather than by electrostatic attraction, carrying the alkali metals as charge balancers. Once the anions are in the pores, with their accompanying cations, the cations exchange, and the hydrogen ions released by the exchange effect condensation of silica. The high ratio silicate remaining outside the resin is the composition remaining after the resin particles are removed.

Concentrated solutions of sodium or potassium silicate with $SiO_2:M_2O$ molar ratio of 1:1 to 2:1 may also be used in the practice of the present invention. In solutions of higher ratios an increasing proportion of silica forms extremely small three-dimensional, internally condensed silicate polymer-ions or charged particles. The silicon atoms in the interior are linked only to other silicon atoms by oxygen atoms, but each silicon atom on the exterior bears at least one OH group. This unit is the beginning of a colloidal particle that is about 1 nm in diameter. After this unit is surrounded by further condensation of monomer, the unit becomes a silica particle of much higher particle size having a core of $SiO_2$. Colloidal species are then present in solutions of sodium silicates having $SiO_2:Na_2O$ ratios greater than 2:1 and that at higher ratios a greater proportion of the silica is present as polysilicate ions or particles smaller than about 30 nm diameter.

Silicates in the $SiO_2:Na_2O$ ratio range of 1:1 to 4:1 contain increasing amounts of larger anions and colloidal silica as shown by the average molecular weight:

| Molar Ratio SiO$_2$:Na$_2$O | Average Molecular Weight |
|---|---|
| 0.48 | 60 |
| 1.01 | 70 |
| 2.03 | 150 |
| 3.32 | 325 |
| 3.90 | 400 |

In a potassium silicate solution of 4.0 molar ratio the average molecular weight is about 490.

Typical commercial sodium and potassium silicates for use in the practice of the present invention are shown hereunder in Table IV.

TABLE IV

| Commercial Silicates | Wt. ratio[a] SiO$_2$:M$_2$O | Modulus[a] SiO$_2$:M$_2$O | M$_2$O[a] wt % | SiO$_2$ wt % | H$_2$O wt % | Viscosity (at 20° C.) | pH |
|---|---|---|---|---|---|---|---|
| anhydrous glasses | | | | | | | |
| sodium silicates | 3.22 | 3.33 | 23.5 | 75.7 | | | |
|  | 2.00 | 2.06 | 33.0 | 66.0 | | | |
| potassium silicates | 2.50 | 3.92 | 28.3 | 70.7 | | | |
| hydrated amorphous powders | | | | | | | |
| sodium silicates | 3.22 | 3.33 | 19.2 | 61.8 | 18.5 | | |
|  | 2.00 | 2.06 | 27.0 | 64.0 | 18.5 | | |
| solutions | | | | | | | |
| sodium silicates | 1.60 | 1.65 | 19.7 | 31.5 | | 7.00 | 12.8 |
|  | 2.00 | 2.06 | 18.0 | 36.0 | | 70.00 | 12.2 |
|  | 2.50 | 2.58 | 10.6 | 26.5 | | 0.06 | 11.7 |
|  | 2.88 | 2.97 | 11.0 | 31.7 | | 0.96 | 11.5 |
|  | 3.22 | 3.32 | 8.9 | 28.7 | | 0.18 | 11.3 |
|  | 3.75 | 3.86 | 6.8 | 25.3 | | 0.22 | 10.8 |
| potassium silicates | 2.50 | 3.93 | 8.3 | 20.8 | | 0.04 | 11.30 |
|  | 2.20 | 3.45 | 9.05 | 19.9 | | 0.01 | 11.55 |
|  | 2.10 | 3.30 | 12.5 | 26.3 | | 1.05 | 11.70 |
|  | 1.80 | 2.83 | 16.4 | 29.5 | | 1.30 | 12.15 |
| crystalline solids | | | | | | | |
| sodium orthosilicate | | 0.50 | 60.8 | 28.8 | 9.5 | | |
| anhydrous sodium metasilicate | | 1.00 | 51.0 | 47.1 | 2.0 | | |
| sodium metasilicate pentahydrate | | 1.00 | 29.3 | 26.4 | 42.0 | | |
| sodium sesquisilicate | | 0.67 | 36.7 | 24.1 | 38.1 | | |

[a]M represents Na or K.

In the practice of the present invention commercial silicate solutions of 3.3 molar ratio for sodium silicate and 3.9 molar ratio for potassium silicate are preferred.

The commercially obtained solutions, of course, may be modified prior to their use in the process of the present invention, such as by changing their pH, viscosity, concentration or operating temperature by techniques known to those skilled in the art.

The Process of Separating the Product

The alkali metal silicate solution is prepared in water at the desired temperature, usually chosen as ambient temperature of 20°–25° C., for reasons of operating convenience, but can be prepared and maintained at higher or lower than ambient temperature if so desired. Reasons to use other than ambient temperature include ionization of the alkali metal silicates in water and formation of particles. Although the alkali silicate solution may be close to saturation, it is generally preferable to use less than saturated solutions as this condition facilitate the exchange of alkali metal silicate ions with the hydrogen ion in the resin. Also, the solids content must remain below the gelation limit as ratio increases.

The process of the present invention is carried out in a batch operation in which the resin is added to the alkali metal silicate solution with vigorous stirring to achieve a homogeneous slurry. After allowing sufficient dwell time the slurry is filtered to separate the solid resin particles which contain the undesired smaller molecules, while the separated solution contains the enriched siliceous particles representing the desired final product.

The following non-limiting examples will further illustrate the process of the present invention.

EXAMPLE 1

Diaion SK-116, 16% cross-linked cation exchange resin was acid treated so as to convert the resin to the hydrogen form. After ignition, no detectable residue was observed. 44.6 g of the converted resin was added to 100 g of a silica solution having a 3.35 SiO$_2$:Na$_2$O molar ratio and 38.5% solids. The mixture was vigorously stirred in a plastic container until it became homogeneous. The homogeneous mixture was filtered to separate the resin particles from the mixture. Upon analysis the solution had a molar ratio of 4.75 SiO$_2$:Na$_2$O, a solid content of 26.85% and an average molecular weight of 540.

EXAMPLE 2

20 g of DOWEX HGR-W2, 10% cross-linked, hydrogen form resin was thoroughly mixed with 50 g of water. The mixture was added to 100 g of a silicate solution having a 3.35 SiO$_2$:Na$_2$O molar ratio and 38.5% solid content to form a mixture thereof. The mixture was vigorously stirred in a plastic container until it became homogeneous. The homogeneous mixture was filtered to obtain a solution by separating the resin particles from the mixture. Upon analysis the solution had a molar ratio of 3.96 $SiO_2$:$Na_2O$, a solid content of 22.43% and an average molecular weight of 390.

EXAMPLE 3

25 g of Diaion, SK-116, thoroughly exchanged to the hydrogen form, was added to 100 g of a silicate solution of 3.97 $SiO_2$:$K_2O$ molar ratio, 29.1% solids, which was vigorously stirred in a plastic beaker. The resulting solution was filtered. The molar ratio of this solution was 5.35, its solid content was 20.7% and its average molecular weight was 700.

EXAMPLE 4

75 g of silicate solution of 3.27 $SiO_2$:$K_2O$ molar ratio, 39.15% solids was diluted with 35 g of water. Then 28 g of Diaion, SK-116, thoroughly exchanged to the hydrogen form, was added and vigorously stirred in a plastic beaker. The resulting solution was filtered. The molar ratio of this solution was 4.56, its solid content was 21.58% and its average molecular weight was 560.

Having described the invention with reference to its preferred embodiments, it is to be understood that modifications within the scope of the invention will be apparent to those skilled in the art.

What is claimed is:

1. A method of preparing an aqueous alkali metal oxide silicate solution having a silica to alkali metal oxide molar ratio of from about 3.5 to about 6.0 and a total solids content of from about 20 to about 40% w/w, said method comprising the steps of:

contacting a strong hydrogen exchanged cation exchange resin cross-linked of from about 10 to about 16% said resin having the property which at 10% cross-linking is effective to exclude molecules of 800 molecular weight with an aqueous alkali metal oxide silicate solution;

allowing the separation of smaller anionic molecules by exchange with hydrogen at hydrogen ion sites on said cation exchange resin from larger, more siliceous anionic molecules; and collecting when the silica to alkali metal oxide ratio is from about 3.5 to about 6.0 said larger, more siliceous anionic molecules from said alkali metal oxide silicate solution.

2. The method of claim 1 wherein said alkali metal oxide silicate solution is sodium oxide silicate solution.

3. The method of claim 1 wherein said alkali metal oxide silicate solution is potassium oxide silicate solution.

4. The method of claim 1 wherein said step of contacting the cation exchange resin with said alkali metal oxide silicate solution is by stirring.

5. The method of claim 1 wherein said step of contacting the cation exchange resin with said alkali metal oxide silicate solution is by introducing said resin into an alkali metal oxide silicate solution having a silica to alkali metal oxide ratio of from about 1:1 to 4:1.

6. The method of claim 5 wherein said alkali metal silicate is sodium silicate.

7. The method of claim 6 wherein said sodium silicate has a molar ratio of about 3.3.

8. The method of claim 5 wherein said alkali metal silicate is potassium silicate.

9. The method of claim 8 wherein said potassium silicate has a molar ratio of 3.9.

10. The method of claim 1 wherein said more siliceous anionic molecules are collected by filtering said cation exchange resin from the solution.

* * * * *